(12) United States Patent
Yang et al.

(10) Patent No.: US 9,262,188 B1
(45) Date of Patent: Feb. 16, 2016

(54) VIRTUAL ASSET MANAGEMENT IN DATA CENTER

(71) Applicant: EMC Corporation, Hopkinton, MA (US)

(72) Inventors: Ziye Yang, Shanghai (CN); Chenhui Fan, Shanghai (CN); Lintao Wan, Shanghai (CN); Qiyan Chen, Shanghai (CN); Stephen Todd, Shrewsbury, MA (US)

(73) Assignee: EMC Corporation, Hopkinton, MA (US)

(*) Notice: Subject to any disclaimer, the term of this patent is extended or adjusted under 35 U.S.C. 154(b) by 229 days.

(21) Appl. No.: 13/622,475

(22) Filed: Sep. 19, 2012

(51) Int. Cl.
*G06F 9/455* (2006.01)

(52) U.S. Cl.
CPC .................................. *G06F 9/45533* (2013.01)

(58) Field of Classification Search
None
See application file for complete search history.

(56) References Cited

U.S. PATENT DOCUMENTS

| | | | |
|---|---|---|---|
| 2009/0327471 A1* | 12/2009 | Astete et al. | 709/223 |
| 2010/0153945 A1* | 6/2010 | Bansal et al. | 718/1 |
| 2011/0055378 A1* | 3/2011 | Ferris et al. | 709/224 |
| 2011/0276951 A1* | 11/2011 | Jain | 717/140 |
| 2011/0296201 A1* | 12/2011 | Monclus et al. | 713/190 |
| 2012/0089980 A1* | 4/2012 | Sharp et al. | 718/1 |
| 2012/0180041 A1* | 7/2012 | Fletcher | 718/1 |
| 2012/0284708 A1* | 11/2012 | Anderson et al. | 718/1 |
| 2013/0283273 A1* | 10/2013 | Miyazaki | 718/1 |

OTHER PUBLICATIONS

"RFID in the Data Center," http://www.datacenterknowledge.com/archives/2008/11/03/rfid-in-the-data-center/, Nov. 2008, 2 pages.
"RFID for Data Center Tracking," http://odinrfid.com/rfid-for-data-center-tracking, 1 page.
P. Mell et al., "The NIST Definition of Cloud Computing," U.S. Department of Commerce, Computer Security Division, National Institute of Standards and Technology, Special Publication 800-145, Sep. 2011, 7 pages.

* cited by examiner

*Primary Examiner* — Dong Kim
(74) *Attorney, Agent, or Firm* — Ryan, Mason & Lewis, LLP

(57) ABSTRACT

Techniques are disclosed for managing assets, such as virtual assets, in a computing system implemented with distributed virtual infrastructure. In one example, a method comprises the following steps. Operational information associated with a plurality of virtual assets in a data center is obtained in a trusted manner. The data center is implemented via a distributed virtual infrastructure. At least a portion of the operational information for at least a portion of the plurality of virtual assets in the data center is reported. The operational information reported is operational information pertaining to one or more virtual assets that the data center provides for a tenant of the data center. The obtaining and reporting steps are performed by at least one processing device operating as a virtual asset manager operatively coupled to the distributed virtual infrastructure.

17 Claims, 4 Drawing Sheets

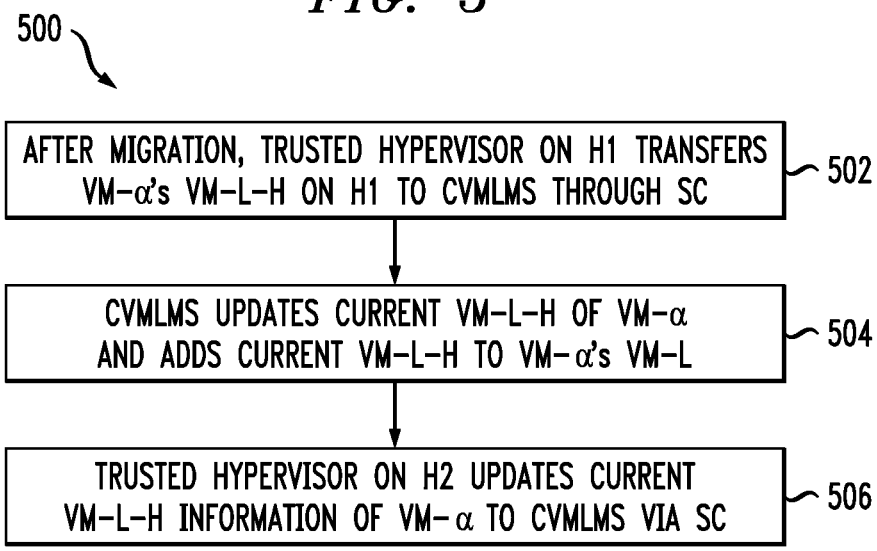
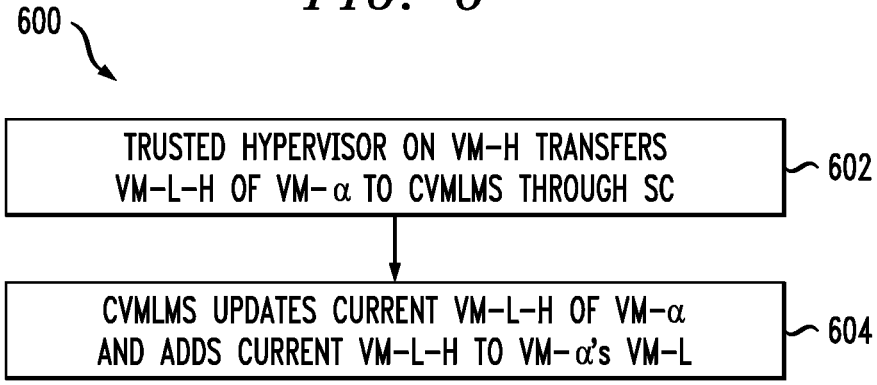

VIRTUAL ASSET MANAGEMENT IN DATA CENTER

FIELD

The field relates to computing systems implemented with a distributed virtual infrastructure, and more particularly to techniques for managing assets in such a computing system implemented with a distributed virtual infrastructure.

BACKGROUND

As is known, many companies track their physical assets (e.g., physical machines including, by way of example, servers) over the course of a fiscal year. However, such a tracking process can be time-consuming. To mitigate this issue, radio frequency identification (RFID) techniques have been employed. For example, in a data center scenario, each physical machine is typically equipped with an RFID tag. When the tracking process begins, personnel use RFID readers to scan and identify all the physical machines in the data center via the RFID tags.

However, more and more companies have adopted the approach of having nearly no physical assets, and rather have turned to the new information technology (IT) computing model known as cloud computing. With the prevalence of cloud computing, small companies can rent resources (e.g., computing, storage, network) from cloud providers to build their business services. Moreover, companies prefer renting virtual machines from so-called Infrastructure-as-a-Service (IaaS) providers as a basic computing container due to its flexibility. Then, those companies will not possess physical assets (e.g., servers) but rather they will utilize virtual assets such as virtual machines. However, a company's ability to know that it is getting what it is paying for with regard to virtual machines that it rents from a cloud provider has proven to be a problem in existing data centers.

SUMMARY

Embodiments of the invention provide techniques for managing assets, such as virtual assets, in a computing system implemented with distributed virtual infrastructure.

In one embodiment, a method comprises the following steps. Operational information associated with a plurality of virtual assets in a data center is obtained in a trusted manner. The data center is implemented via a distributed virtual infrastructure. At least a portion of the operational information for at least a portion of the plurality of virtual assets in the data center is reported. The operational information reported is operational information pertaining to one or more virtual assets that the data center provides for a tenant of the data center. The obtaining and reporting steps are performed by at least one processing device operating as a virtual asset manager operatively coupled to the distributed virtual infrastructure.

In one example, the plurality of virtual assets may comprise virtual machines implemented on one or more virtual machine hosts. The operational information may comprise information pertaining to a lifetime of a given virtual machine. The lifetime of a given virtual machine may be expressed as a data set comprising an execution start time and an execution end time for the given virtual machine. The operational information may comprise information pertaining to which virtual machines are active on a given virtual machine host between a first time and a second time.

In another example, the step of obtaining operational information in a trusted manner may further comprise obtaining the operational information across one or more secure communication channels. Further, the step of obtaining operational information in a trusted manner may further comprise obtaining the operational information from a virtual asset that has at least one of a trusted device and a trusted hypervisor associated therewith.

In another embodiment, a computer program product is provided which comprises a processor-readable storage medium having encoded therein executable code of one or more software programs. The one or more software programs when executed by the at least one processing device implement steps of the above-described method.

In yet another embodiment, an apparatus comprises a memory and a processor operatively coupled to the memory and configured to perform steps of the above-described method.

Advantageously, embodiments described herein provide techniques that enable companies and other interested entities (e.g., the government or other law enforcement) to track virtual assets rented from a data center provider in a trusted manner.

These and other features and advantages of the present invention will become more readily apparent from the accompanying drawings and the following detailed description.

BRIEF DESCRIPTION OF THE DRAWINGS

FIG. 5 illustrates a second methodology associated with a central virtual machine lifetime management system in accordance with one embodiment of the invention.

FIG. 6 illustrates a third methodology associated with a central virtual machine lifetime management system in accordance with one embodiment of the invention.

DETAILED DESCRIPTION

Embodiments of the present invention will be described herein with reference to exemplary computing systems and data storage systems and associated servers, computers, storage units and devices and other processing devices. It is to be appreciated, however, that embodiments of the invention are not restricted to use with the particular illustrative system and device configurations shown. Moreover, the phrases "computing system" and "data storage system" as used herein are intended to be broadly construed, so as to encompass, for example, private or public cloud computing or storage systems, as well as other types of systems comprising distributed virtual infrastructure. However, a given embodiment may more generally comprise any arrangement of one or more processing devices.

As used herein, the term "cloud" refers to a collective computing infrastructure that implements a cloud computing paradigm. For example, as per the National Institute of Standards and Technology (NIST Special Publication No. 800-145), cloud computing is a model for enabling ubiquitous, convenient, on-demand network access to a shared pool of configurable computing resources (e.g., networks, servers, storage, applications, and services) that can be rapidly provisioned and released with minimal management effort or service provider interaction.

As used herein, a "data center" refers to a computing system or environment with one or more processing elements that stores and/or processes data for one or more tenants (e.g., clients or customers) of a provider entity that manages the computer system or environment.

As used herein, the term "asset" refers to one or more resources associated with a data center. Thus, a "virtual asset" refers to one or more resources associated with a data center that is implemented via a distributed virtual infrastructure. In one example, such virtual assets include one or more virtual machines.

Figure 1A:
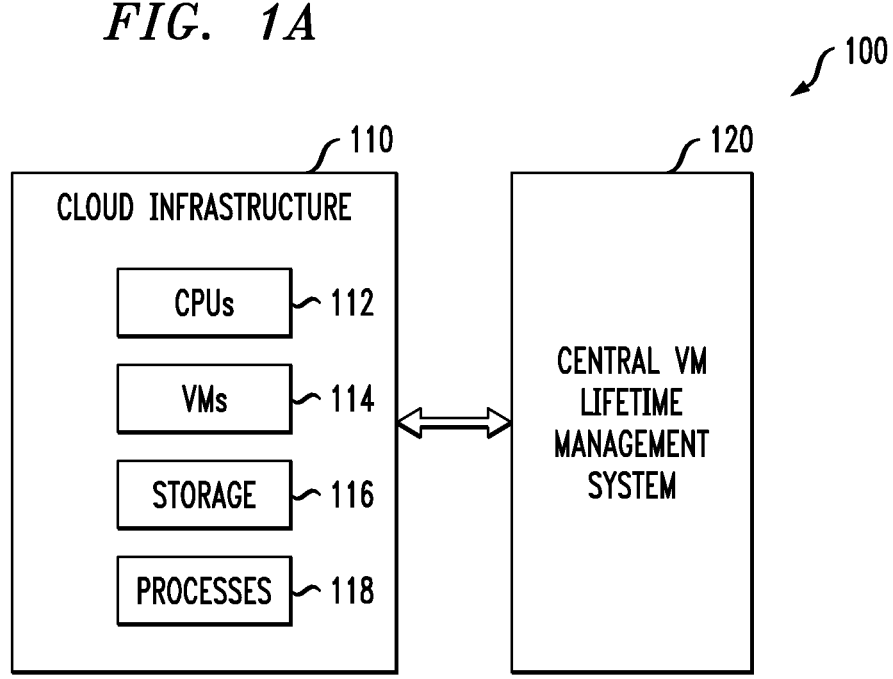
FIG. 1A illustrates cloud infrastructure and a central virtual machine lifetime management system in accordance with one embodiment of the invention.

FIG. 1A shows a system 100 configured in accordance with an illustrative embodiment of the present invention. The system 100 comprises cloud infrastructure 110 and a central virtual machine (VM) lifetime management system 120. As will be explained in detail below, central VM lifetime management system 120 manages virtual assets implemented within cloud infrastructure 110, as will be explained in detail herein. Cloud infrastructure 110 is illustratively depicted in the figure as comprising an execution environment with execution components comprising one or more central processing units (CPUs) 112, one or more VMs 114, and storage devices 116 (upon which logical units (LUs) are implemented) that execute one or more processes 118 that operate on one or more process input data sets that generate one or more process output data sets.

Although system elements 110 and 120 are shown as separate elements in FIG. 1A, these elements or portions thereof may be implemented at least in part on a common processing platform. In other embodiments, one or more of the system elements 110 and 120 may each be implemented on a separate processing platform, such as the processing platform to be described below in conjunction with FIG. 2. For example, the cloud infrastructure 110 may be implemented on a first processing device of a first processing platform and central VM lifetime management system 120 may be implemented on a second processing device of a second processing platform. It is also to be understood that a given embodiment of the system 100 may include multiple instances of the system elements 110 and 120, although only single instances of such elements are shown in the system diagram for clarity and simplicity of illustration.

Figure 1B:
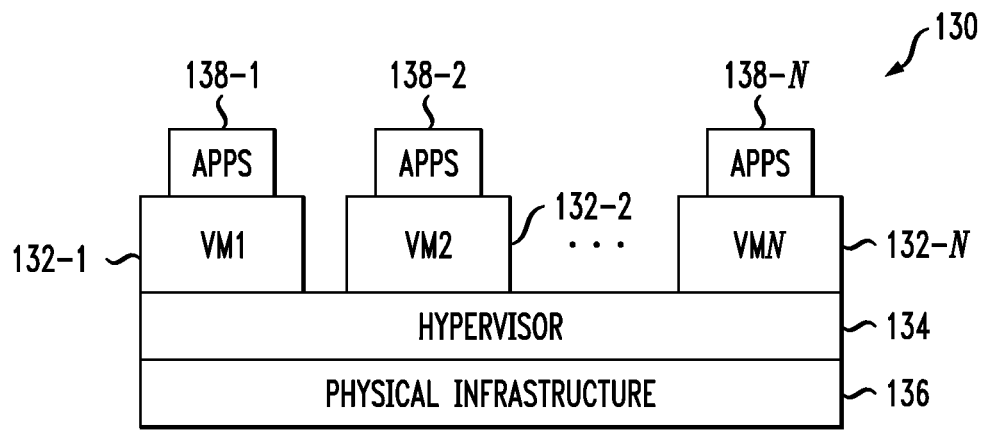
FIG. 1B illustrates a more detailed view of the cloud infrastructure of FIG. 1A.

As shown in FIG. 1B, the cloud infrastructure 130 (corresponding to 110 in FIG. 1A) comprises VMs 132-1, 132-2, . . . 132-N implemented using a hypervisor 134. The hypervisor 134, as mentioned above, is an example of what is more generally referred to herein as "virtualization infrastructure." The hypervisor 134 runs on physical infrastructure 136 (e.g., such as may include CPUs 112 and/or storage devices 116 in FIG. 1A). The cloud infrastructure 130 further comprises sets of applications 138-1, 138-2, . . . 138-N running on respective ones of the virtual machines 132-1, 132-2, . . . 132-N (utilizing associated LUs) under the control of the hypervisor 134.

Although only a single hypervisor 134 is shown in the example of FIG. 1B, a given embodiment of cloud infrastructure configured in accordance with an embodiment of the invention may include multiple hypervisors, each running on its own physical infrastructure. Portions of that physical infrastructure might be virtualized.

As is known, virtual machines are logical processing elements that may be instantiated on one or more physical processing elements (e.g., servers, computers, processing devices). That is, a "virtual machine" generally refers to a software implementation of a machine (i.e., a computer) that executes programs in a manner similar to that of a physical machine. Thus, different virtual machines can run different operating systems and multiple applications on the same physical computer. Virtualization is implemented by the hypervisor 134 which, as shown in FIG. 1B, is directly inserted on top of the computer hardware in order to allocate hardware resources of the physical computer (physical infrastructure 136) dynamically and transparently. The hypervisor 134 affords the ability for multiple operating systems to run concurrently on a single physical computer and share hardware resources with each other.

An example of a commercially available hypervisor platform that may be used to implement portions of the cloud infrastructure 130 (110) in one or more embodiments of the invention is the VMware® vSphere™ which may have an associated virtual infrastructure management system such as the VMware® vCenter™. The underlying physical infrastructure 136 may comprise one or more distributed processing platforms that include storage products such as VNX and Symmetrix VMAX, both commercially available from EMC Corporation of Hopkinton, Mass. A variety of other storage products may be utilized to implement at least a portion of the cloud infrastructure 130 (110).

Figure 2:
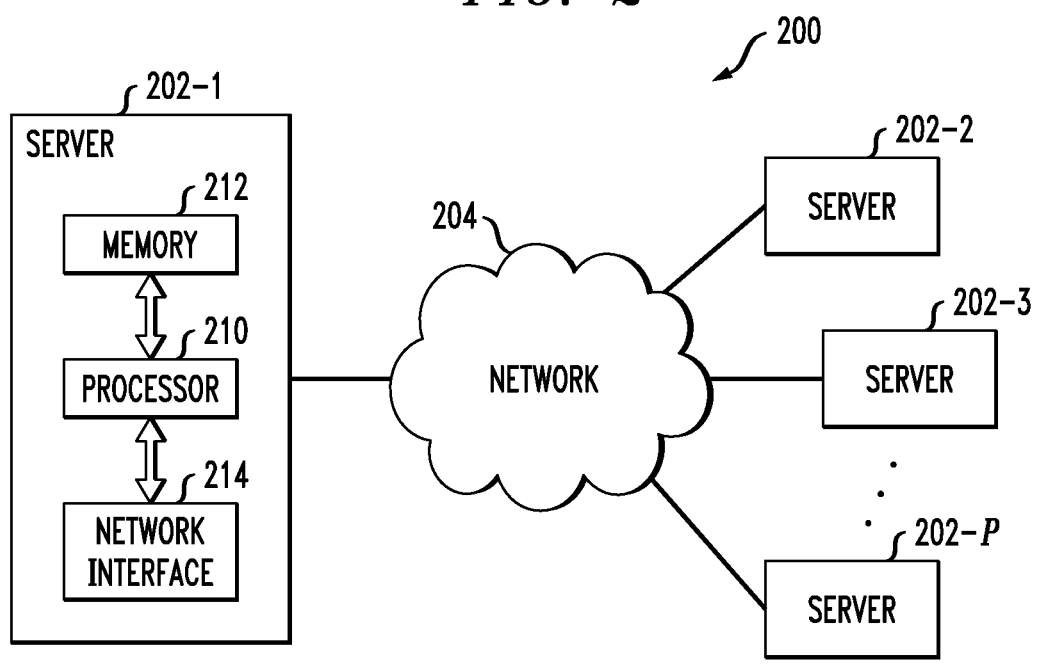
FIG. 2 illustrates a processing platform on which the cloud infrastructure and the central virtual machine lifetime management system of FIG. 1A are implemented in accordance with one or more embodiments of the invention.

An example of a processing platform on which the cloud infrastructure 110 and/or central VM lifetime management system 120 of FIG. 1A may be implemented is processing platform 200 shown in FIG. 2. The processing platform 200 in this embodiment comprises at least a portion of the system 100 and includes a plurality of servers, denoted 202-1, 202-2, 202-3, . . . 202-P, which communicate with one another over a network 204. One or more of the elements of system 100 may therefore each run on a server, computer or other processing platform element, which may be viewed as an example of what is more generally referred to herein as a "processing device." As illustrated in FIG. 2, such a device generally comprises at least one processor and an associated memory, and implements one or more functional modules for controlling certain features of system 100. Again, multiple elements or modules may be implemented by a single processing device in a given embodiment.

The server 202-1 in the processing platform 200 comprises a processor 210 coupled to a memory 212. The processor 210 may comprise a microprocessor, a microcontroller, an application-specific integrated circuit (ASIC), a field programmable gate array (FPGA) or other type of processing circuitry, as well as portions or combinations of such circuitry elements. The memory 212 may be viewed as an example of what is more generally referred to herein as a "computer program product." A computer program product comprises a processor-readable storage medium having encoded therein executable code of one or more software programs. Such a memory may comprise electronic memory such as, by way of example, random access memory (RAM), read-only memory (ROM) or other types of memory, in any combination. The computer program code when executed by a processing device such as the server 202-1 causes the device to perform functions associated with one or more of the elements of system 100. One skilled in the art would be readily able to implement such software given the teachings provided herein. Other examples of computer program products embodying embodiments of the invention may include, for example, optical or magnetic disks.

Also included in the server 202-1 is network interface circuitry 214, which is used to interface the server with the network 204 and other system components. Such circuitry may comprise conventional transceivers of a type well known in the art.

The other servers 202 of the processing platform 200 are assumed to be configured in a manner similar to that shown for server 202-1 in the figure.

The processing platform 200 shown in FIG. 2 may comprise additional known components such as batch processing systems, parallel processing systems, physical machines, virtual machines, virtual switches, storage volumes, logical units, etc. Again, the particular processing platform shown in the figure is presented by way of example only, and system 100 may include additional or alternative processing platforms, as well as numerous distinct processing platforms in any combination.

Also, numerous other arrangements of servers, computers, storage devices or other components are possible in system 100. Such components can communicate with other elements of the system 100 over any type of network, such as a wide area network (WAN), a local area network (LAN), a satellite network, a telephone or cable network, or various portions or combinations of these and other types of networks.

Illustrative details of central VM lifetime management system 120 will now be described with reference to FIGS. 3 through 6.

As will be explained in detail, embodiments of the invention provide methods and apparatus to track VM-based virtual assets in a cloud infrastructure in a trusted way. It is meaningful to track the lifetime of virtual machines since it benefits both tenants and governments. For tenants who rent VMs, they expect to get the accurate status of their VMs, for which they can pay significant amounts of money, from the cloud providers. For governments, they may need to obtain accurate information about the virtual assets of a company when there are any legal issues. In accordance with embodiments of the invention, methods and apparatus are provided for cloud providers to provide a central service in a data center to track the lifetime of each VM and demonstrate the trustiness of such tracking information to customers and interested parties.

Figure 3:
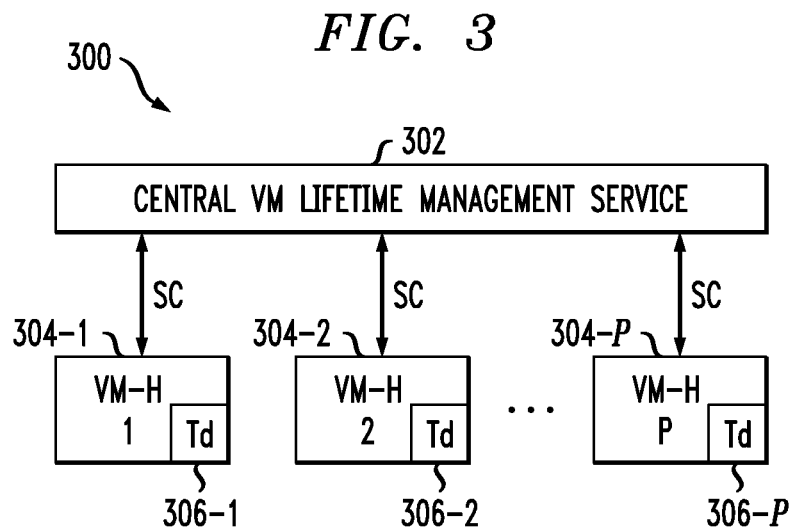
FIG. 3 illustrates a central virtual machine lifetime management system in accordance with one embodiment of the invention.

FIG. 3 shows a central virtual machine lifetime management system in accordance with one embodiment of the invention. As shown, system 300 includes a central VM lifetime management service (CVMLMS) 302 that is operatively coupled to a plurality of servers 304-1, 304-2, . . . , 304-P that host one or more virtual machines. For ease of illustration and description below, we define the following acronyms used in FIGS. 3-6:

VM-ID: Unique identifier (ID) of the VM in a data center.

VM-H: The server (or other computing device) which hosts VMs, i.e., 304-1, 304-2, . . . , 304-P in FIG. 3. Also referred to as a virtual machine host.

TD: A trust device which is used to uniquely identify the VM-H, e.g., RFID tag, TPM (trusted platform module) or RSA (Rivest-Shamir-Adleman) based secure device are some examples of a trusted device, i.e., 306-1, 306-2, . . . , 306-P in FIG. 3.

VM-L-H: The lifetime of a VM on VM-H, which can be expressed by a tuple, i.e., <VM-ID, VM-H, begin_execution_time, end_time, . . . >

VM-L: The lifetime of a VM, which is a set composed of all VM-L-Hs.

VM-H-<t1, t2>: Tuple expresses the active VMs on VM-H from time t1 to t2.

SC: Secure network channel for information exchange.

Trusted Hypervisor: Privileged (and thus trusted) software that manages the VMs on a VM-H (e.g., hypervisor 134 in FIG. 1B).

CVMLMS 302 is a trusted service that manages the following information:

(i) The mapping between each tenant and the VMs of the tenant.

(ii) The VM-L of each VM.

(iii) For each VM-H 304, CVMLMS 302 maintains VM-H-<t1, t2>. Here t1 is the beginning service time of VM-H, t2 is the current service time.

Although in FIG. 3, CVMLMS 302 is depicted as a single block directly connected to each VM-H 304, CVMLMS 302 can be a distributed and cascade service in other embodiments. The communication channel between CVMLMS 302 and each VM-H 304 is secure to avoid eavesdropping from a third party.

In order to ensure the VM tracking process is trusted, in illustrative embodiments, the following condition are satisfied:

(i) The trustworthiness of VM-H: Trustworthiness is considered in both hardware and software. With respect to hardware, we ensure that each VM-H 304 is equipped with some TD device 306 for unique identification. With respect to software, we guarantee the trustworthiness of the most privileged software, i.e., the hypervisor, by using a trusted hypervisor. When these two conditions are satisfied, it can be considered that the information delivered by each VM-H 304 via the trusted hypervisor is trustworthy.

(ii) The communication channel (SC) between CVMLMS 302 and each VM-H 304 is trusted by using one or more well-known communication security protocols.

(iii) The trustiness of CVMLMS 302: As all data on each VMs's lifetime is logged in this system, security techniques are applied in CVMLMS 302.

Figure 4:
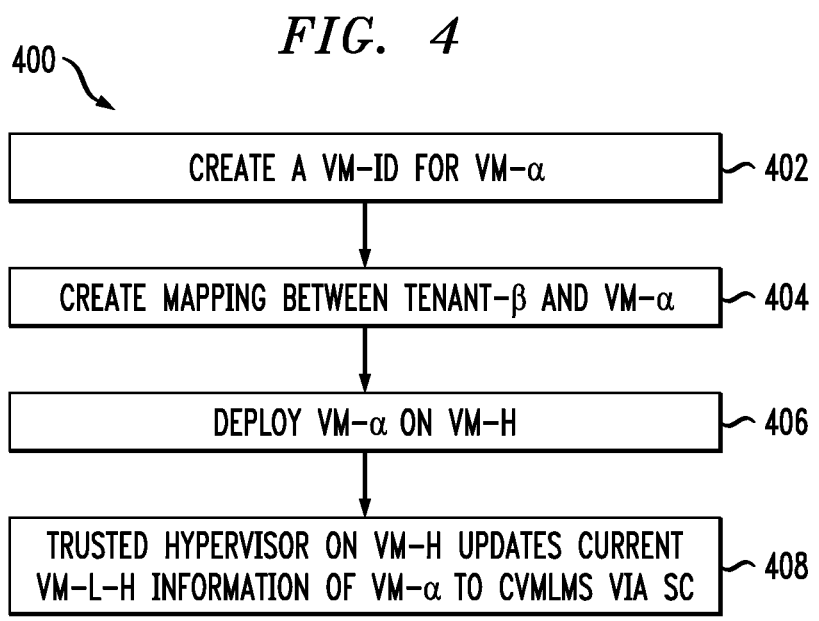
FIG. 4 illustrates a first methodology associated with a central virtual machine lifetime management system in accordance with one embodiment of the invention.

FIGS. 4-6 show various tracking methodologies associated with CVMLMS 302.

In particular, FIG. 4 shows a method 400 of tracking the lifetime of a VM (named as VM-α). That is, when a VM-α is created by a tenant (tenant-β), CVMLMS 302 conducts the following steps:

Step 402 creates a VM-ID for VM-α.

Step 404 creates a mapping between the tenant-β and VM-α.

Step 406 deploys VM-α on a VM-H.

Step 408: the trusted hypervisor on VM-H updates the current VM-L-H information of VM-α to CVMLMS 302 via SC.

FIG. 5 illustrates a method 500 depicting what tracking occurs when a migration of VM-α happens between two VM-Hs (names as H1 and H2) during the lifetime of VM-α.

Step 502: after migration, the trusted hypervisor on H1 transfers VM-α's VM-L-H on H1 to CVMLMS 302 through SC.

Step 504: Step 504: CVMLMS 302 updates the current VM-L-H of VM-α through the received VM-L-H and adds the current VM-L-H to VM-α's VM-L.

Step 506: the trusted hypervisor on H2 updates the current VM-L-H information of VM-α to CVMLMS 302 via SC.

FIG. 6 illustrates a method 600 depicting what tracking occurs when the VM-α is destroyed on a VM-H, thus ending the lifetime of VM-α.

Step 602: the trusted hypervisor on VM-H transfers the VM-L-H of VM-α to CVMLMS 302 through SC.

Step 604: CVMLMS 302 updates the current VM-L-H of VM-α and adds the current VM-L-H to VM-α's VM-L.

CVMLMS 302 also provides for querying of VM location history by a tenant. That is, for each VM, CVMLMS 302 can return its VM-L information. Also, CVMLMS 302 allows the tenant to query all VMs owned by the tenant. Also, for each host H which holds the VMs, CVMLMS 302 can also query the active VMs served by H in a time period by VM-H-<t1, t2>. Given the description of illustrative embodiments herein, those of ordinary skill in the art will realize and be able to implement in a straightforward manner other services for CVMLMS 302 that are not expressly listed herein.

It should again be emphasized that the above-described embodiments of the invention are presented for purposes of illustration only. Many variations may be made in the particular arrangements shown. For example, although described in the context of particular system and device configurations, the techniques are applicable to a wide variety of other types of information processing systems, computing systems, data storage systems, processing devices and distributed virtual infrastructure arrangements. In addition, any simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A method comprising:
obtaining, via a central virtual asset manager, operational information associated with a plurality of virtual assets in a data center from two or more hosts in the data center in a trusted manner across respective secure network channels established between the central virtual asset manager and respective ones of the hosts;
tracking a lifetime of a given one of the virtual assets based on the obtained operational information by creating a mapping between a given tenant of the data center and the given virtual asset and maintaining operational information for the given virtual asset relating to times at which the given virtual asset is implemented on respective ones of the two or more hosts in the data center, wherein tracking the lifetime of a given virtual asset comprises receiving, at the central virtual asset manager, operational information for the given virtual asset upon migration of the given virtual asset from one host to another host, and wherein the maintained operational information for the given virtual asset comprises:
an identifier of the given virtual asset;
an identifier of a given one of the two or more hosts;
a start time for execution of the given virtual asset on the given host;
an end time for execution of the given virtual asset on the given host;
a beginning service time of the given host; and
a current service time of the given host;
providing, via the central virtual asset manager, for querying of a location history of the given virtual asset for a specified time period by the given tenant; and
reporting the location history, which comprises the maintained operational information, of the given virtual asset in the data center to the given tenant in response to a query received from the given tenant, wherein the given host and the specified time period is provided by the given tenant to identify active virtual assets associated with the given tenant served by the given host for the specified time period;
wherein the obtaining, tracking, providing and reporting steps are performed by at least one processing device operating as the central virtual asset manager.

2. The method of claim 1, wherein the given virtual asset comprises a given virtual machine implemented on one or more virtual machine hosts.

3. The method of claim 2, wherein the obtained operational information comprises information pertaining to which of a plurality of virtual machines are active on a given virtual machine host over a given time period.

4. The method of claim 2, wherein the step of tracking the given virtual machine further comprises deploying the given virtual machine on a given virtual machine host.

5. The method of claim 4, wherein the step of tracking the given virtual machine further comprises receiving from a trusted hypervisor operating on the given virtual machine host current operational information for the given virtual machine.

6. The method of claim 2, wherein the step of tracking the given virtual machine further comprises receiving current operational information for the given virtual machine upon destruction of the given virtual machine on a given virtual machine host.

7. The method of claim 1, wherein the step of obtaining operational information in a trusted manner further comprises obtaining the operational information from a virtual asset that has at least one of a trusted device and a trusted hypervisor associated therewith.

8. The method of claim 1, wherein the step of reporting at least a portion of the operational information further comprises reporting at least a portion of the operational information to an entity other than the given tenant.

9. The method of claim 1, wherein the step of tracking the given virtual asset further comprises assigning a unique identifier to the given virtual asset.

10. The method of claim 1, wherein the step of obtaining operational information in a trusted manner further comprises verifying hardware of a given one of the hosts by checking a unique identification of a trusted device associated with the given host and verifying software of the given host by ensuring that the operational information is delivered from a trusted hypervisor running on the given host.

11. The method of claim 10, wherein the trusted device of the given host comprises one of: a radio frequency identification tag, a trusted platform module and a Rivest-Shamir-Adleman based secure device.

12. A computer program product comprising a non-transitory processor-readable storage medium having encoded therein executable code of one or more software programs, wherein the one or more software programs when executed by the at least one processing device implement the steps of:
obtaining, via a central virtual asset manager, operational information associated with a plurality of virtual assets in a data center from two or more hosts in the data center in a trusted manner across respective secure network channels established between the central virtual asset manager and respective ones of the hosts;
tracking a lifetime of a given one of the virtual assets based on the obtained operational information by creating a mapping between a given tenant of the data center and the given virtual asset and maintaining operational information for the given virtual asset relating to times at which the given virtual asset is implemented on respective ones of the two or more hosts in the data center, wherein tracking the lifetime of a given virtual asset comprises receiving, at the central virtual asset manager, operational information for the given virtual asset upon migration of the given virtual asset from one host to another host, and wherein the maintained operational information for the given virtual asset comprises:
an identifier of the given virtual asset;
an identifier of a given one of the two or more hosts;
a start time for execution of the given virtual asset on the given host;
an end time for execution of the given virtual asset on the given host;
a beginning service time of the given host; and
a current service time of the given host;
providing, via the central virtual asset manager, for querying of a location history of the given virtual asset for a specified time period by the given tenant; and
reporting the location history, which comprises the maintained operational information, of the given virtual asset in the data center to the given tenant in response to a query received from the given tenant, wherein the given host and the specified time period is provided by the given tenant to identify active virtual assets associated with the given tenant served by the given host for the specified time period;
wherein the obtaining, tracking, providing and reporting steps are performed by the at least one processing device operating as the central virtual asset manager.

13. The computer program product of claim 12, wherein the given virtual asset comprises a given virtual machine implemented on one or more virtual machine hosts.

14. An apparatus comprising:
at least one memory; and
at least one processor operatively coupled to the at least one memory and configured to implement a central virtual asset manager, the central virtual asset manager being configured to:
obtain operational information associated with a plurality of virtual assets in a data center from two or more hosts in the data center in a trusted manner across respective secure network channels established between the central virtual asset manager and respective ones of the hosts;
track a lifetime of a given one of the virtual assets based on the obtained operational information by creating a mapping between a given tenant of the data center and the given virtual asset and maintaining operational information relating to times at which the given virtual asset is implemented on respective ones of the two or more hosts in the data center, wherein tracking the lifetime of a given virtual asset comprises receiving operational information for the given virtual asset upon migration of the given virtual asset from one host to another host, and wherein the maintained operational information for the given virtual asset comprises:
an identifier of the given virtual asset;
an identifier of a given one of the two or more hosts;
a start time for execution of the given virtual asset on the given host;
an end time for execution of the given virtual asset on the given host;
a beginning service time of the given host; and
a current service time of the given host;
provide for querying of a location history of the given virtual asset for a specified time period by the given tenant; and
report the location history, which comprises the maintained operational information, of the given virtual asset in the data center to the given tenant in response to a query received from the given tenant, wherein the given host and the specified time period is provided by the given tenant to identify active virtual assets associated with the given tenant served by the given host for the specified time period.

15. The apparatus of claim 14, wherein the given virtual asset comprises a given virtual machine implemented on one or more virtual machine hosts.

16. The apparatus of claim 14, wherein the central virtual asset manager is configured to obtain operational information in a trusted manner by verifying hardware of a given one of the hosts by checking a unique identification of a trusted device associated with the given host and verifying software of the given host by ensuring that the operational information is delivered from a trusted hypervisor running on the given host.

17. The apparatus of claim 16, wherein the trusted device of the given host comprises one of: a radio frequency identification tag, a trusted platform module and a Rivest-Shamir-Adleman based secure device.

* * * * *